(12) United States Patent
Shapson et al.

(10) Patent No.: US 11,044,440 B2
(45) Date of Patent: Jun. 22, 2021

(54) UNIVERSAL MOCA GATEWAY SPLITTER

(71) Applicant: Times Fiber Communications, Inc., Wallingford, CT (US)

(72) Inventors: Brian J. Shapson, Jackson, NJ (US); Robert L. Romerein, Ontario (CA); Rong Hui Li, Brooklyn, NY (US); Hai Qun Hong, Jiangxi (CN)

(73) Assignee: Times Fiber Communications, Inc., Wallingford, CT (US)

( * ) Notice: Subject to any disclaimer, the term of this patent is extended or adjusted under 35 U.S.C. 154(b) by 0 days.

(21) Appl. No.: 16/910,800

(22) Filed: Jun. 24, 2020

(65) Prior Publication Data
US 2021/0136321 A1 May 6, 2021

Related U.S. Application Data

(63) Continuation-in-part of application No. PCT/CN2019/115342, filed on Nov. 4, 2019.
(Continued)

(51) Int. Cl.
*H04N 7/10* (2006.01)
*H04L 12/00* (2006.01)
(Continued)

(52) U.S. Cl.
CPC ............ *H04N 7/104* (2013.01); *H04L 12/00* (2013.01); *H04L 12/2838* (2013.01); *H04L 12/64* (2013.01); *H04L 12/66* (2013.01)

(58) Field of Classification Search
CPC ..... H04N 7/104; H04L 12/00; H04L 12/2838; H04L 12/64; H04L 12/66
See application file for complete search history.

(56) References Cited

U.S. PATENT DOCUMENTS

| 5,058,198 A | 10/1991 | Rocci et al. |
| 5,682,426 A | 10/1997 | Miliani et al. |

(Continued)

FOREIGN PATENT DOCUMENTS

WO 2007047001 A2 4/2007

OTHER PUBLICATIONS

International Search Report and Written Opinion for PCT/US18/24552 dated Apr. 23, 2018; 16 pages.
(Continued)

*Primary Examiner* — Stephen J Clawson
(74) *Attorney, Agent, or Firm* — Blank Rome LLP

(57) ABSTRACT

A Multimedia over Coax Alliance (MoCA) gateway splitter that includes a directional coupler (including a first transmission path and a second transmission path), a gateway port and a cable television (CATV) input port each electrically connected to the first transmission path, and a MoCA port electrically connected to the second transmission path such that the MoCA port is isolated from the CATV input port and coupled to the gateway port. Multiple MoCA ports may be electrically connected to the second transmission path (e.g., via a resistive splitter). The second transmission path may be electrically connected to ground. The MoCA gateway splitter may include multiple (e.g., two or three) gateway ports, each electrically connected to the CATV input port via a directional coupler (and, e.g., one or more hybrid splitters). In those embodiments, each directional coupler may be electrically connected to the MoCA port(s), for example, via a common microstrip node.

38 Claims, 9 Drawing Sheets

Related U.S. Application Data

(60) Provisional application No. 62/959,034, filed on Jan. 9, 2020.

(51) Int. Cl.
    *H04L 12/64*     (2006.01)
    *H04L 12/28*     (2006.01)
    *H04L 12/66*     (2006.01)

(56) References Cited

U.S. PATENT DOCUMENTS

| | | |
|---|---|---|
| 5,821,811 A | 10/1998 | Persson |
| 5,883,597 A | 3/1999 | DeWulf |
| 6,265,670 B1 | 7/2001 | Duesterhoeft et al. |
| 6,676,446 B2 | 1/2004 | Montena |
| 6,751,081 B1 | 6/2004 | Kooiman |
| 7,974,586 B2 | 7/2011 | Romerein et al. |
| 8,081,427 B2 | 12/2011 | Riggsby et al. |
| 8,174,999 B2 | 5/2012 | Kliger et al. |
| 8,286,209 B2 | 10/2012 | Egan, Jr. et al. |
| 8,345,550 B2 | 1/2013 | Laudel et al. |
| 8,356,322 B2 | 1/2013 | Wells et al. |
| 8,397,271 B2 | 3/2013 | Riggsby |
| 8,429,695 B2 | 4/2013 | Halik et al. |
| 8,479,247 B2 | 7/2013 | Shafer |
| 8,510,782 B2 | 8/2013 | Wells et al. |
| 8,589,997 B2 | 11/2013 | Wells |
| 8,752,114 B1 | 6/2014 | Shapson et al. |
| 9,167,286 B2 | 10/2015 | Wells et al. |
| 9,351,051 B2 | 5/2016 | Wells et al. |
| 9,356,796 B2 | 5/2016 | Shapson et al. |
| 9,516,376 B2 | 12/2016 | Wells et al. |
| 9,647,851 B2 | 5/2017 | Newby et al. |
| 9,781,472 B2 | 10/2017 | Wells et al. |
| 9,860,591 B2 | 1/2018 | Wells et al. |
| 9,880,591 B2 | 1/2018 | Yuan |
| 10,045,056 B2 | 8/2018 | Newby et al. |
| 10,142,677 B2 | 11/2018 | Wells et al. |
| 10,149,004 B2 | 12/2018 | Wells et al. |
| 10,154,302 B2 | 12/2018 | Wells et al. |
| 10,154,303 B2 | 12/2018 | Wells et al. |
| 10,154,304 B2 | 12/2018 | Wells et al. |
| 10,284,903 B2 | 5/2019 | Wells et al. |
| 10,284,904 B2 | 5/2019 | Wells et al. |
| 10,341,718 B2 | 7/2019 | Wells et al. |
| 10,341,719 B2 | 7/2019 | Wells et al. |
| 10,419,813 B2 | 9/2019 | Wells et al. |
| 10,462,419 B2 | 10/2019 | Li et al. |
| 2002/0073434 A1 | 6/2002 | Pience |
| 2003/0066082 A1 | 4/2003 | Kliger et al. |
| 2003/0192063 A1 | 10/2003 | Runkle |
| 2005/0034167 A1 | 2/2005 | Weinstein et al. |
| 2005/0146398 A1 | 7/2005 | Tsai et al. |
| 2006/0015921 A1 | 1/2006 | Vaughan |
| 2006/0205442 A1 | 9/2006 | Phillips et al. |
| 2008/0120667 A1 | 5/2008 | Zaltsman |
| 2008/0313691 A1 | 12/2008 | Cholas et al. |
| 2009/0031384 A1 | 1/2009 | Brooks et al. |
| 2009/0077608 A1 | 3/2009 | Romerein et al. |
| 2009/0165070 A1 | 6/2009 | McMullin et al. |
| 2009/0180782 A1 | 7/2009 | Bernard et al. |
| 2009/0320086 A1 | 12/2009 | Rijssemus et al. |
| 2009/0327384 A1 | 12/2009 | Petrovic |
| 2010/0017842 A1 | 1/2010 | Wells |
| 2010/0043032 A1 | 2/2010 | Tsao et al. |
| 2010/0125877 A1 | 5/2010 | Wells et al. |
| 2010/0146564 A1 | 6/2010 | Halik et al. |
| 2010/0162340 A1 | 6/2010 | Riggsby |
| 2010/0194492 A1 | 8/2010 | Rijssemus |
| 2010/0235869 A1 | 9/2010 | Zhao et al. |
| 2011/0002245 A1 | 1/2011 | Wall et al. |
| 2011/0010749 A1 | 1/2011 | Alkan |
| 2011/0072472 A1 | 3/2011 | Wells et al. |
| 2011/0113455 A1 | 5/2011 | Wu |
| 2011/0138064 A1 | 6/2011 | Rieger et al. |
| 2012/0042345 A1 | 2/2012 | Tjio et al. |
| 2012/0081190 A1 | 4/2012 | Rijssemus |
| 2012/0159556 A1 | 6/2012 | Alkan |
| 2013/0002958 A1 | 1/2013 | Labro |
| 2013/0061096 A1 | 3/2013 | McCoy |
| 2013/0081096 A1* | 3/2013 | Wells .................. H04N 7/102 725/120 |
| 2013/0091267 A1 | 4/2013 | Urban et al. |
| 2013/0091533 A1 | 4/2013 | Wells et al. |
| 2013/0125193 A1 | 5/2013 | Wells |
| 2013/0181789 A1 | 7/2013 | Rijssemus |
| 2013/0212615 A1 | 8/2013 | Schultz |
| 2013/0227632 A1 | 8/2013 | Wells et al. |
| 2013/0279914 A1 | 10/2013 | Brooks |
| 2013/0283334 A1 | 10/2013 | Tsao et al. |
| 2013/0291029 A1 | 10/2013 | Wells |
| 2015/0154836 A1 | 6/2015 | Neil |
| 2015/0207525 A1 | 7/2015 | Li |
| 2016/0094890 A9* | 3/2016 | Shapson .......... H04N 21/43615 725/149 |
| 2018/0007318 A1 | 1/2018 | Bailey et al. |
| 2018/0027287 A1 | 1/2018 | Wells et al. |
| 2018/0152753 A1 | 5/2018 | Wells et al. |
| 2018/0152754 A1 | 5/2018 | Wells et al. |
| 2018/0152755 A1 | 5/2018 | Wells et al. |
| 2018/0152756 A1 | 5/2018 | Wells et al. |
| 2018/0160170 A1 | 6/2018 | Wells et al. |
| 2018/0160171 A1 | 6/2018 | Wells et al. |
| 2018/0160172 A1 | 6/2018 | Wells et al. |
| 2018/0167668 A1 | 6/2018 | Wells et al. |
| 2018/0167669 A1 | 6/2018 | Wells et al. |

OTHER PUBLICATIONS

Wing-Yan Leung, et al., "Multilayer LTCC Bandpass Filter Design with Enhanced Stopband Characteristics", IEEE Microwave and Wireless Components Letters, vol. 12, No. 7, Jul. 2002, pp. 240-242.

* cited by examiner

UNIVERSAL MOCA GATEWAY SPLITTER

CROSS-REFERENCE TO RELATED APPLICATIONS

This application claims the benefit of priority of PCT Application No. PCT/CN2019/115342, filed on Nov. 4, 2019, and U.S. Provisional Patent Application No. 62/959,034, filed Jan. 9, 2020, the content of which are relied upon and incorporated herein by reference in their entirety.

BACKGROUND

The disclosure relates generally to a gateway splitter and more particularly to a gateway splitter that utilizes a directional coupler.

Typical cable television (CATV) systems provide for sharing a common coaxial medium and permit various users in the system to communicate with the headend of the system, where CATV signals originate, but not with each other (due to the directionality of the signal flow imposed by the nature of the active and passive equipment that direct signals between the head end and the subscribers).

Multimedia over Coax Alliance (MoCA) systems have been developed that operate in a different frequency band than CATV systems. MoCA systems are designed to communicate bilaterally with each other, meaning that any port of a MoCA system device serves both an input and output port. MoCA devices are typically located within a home or building for permitting users to communicate with a dedicated MoCA networking device (a gateway device) that provides functionality for each user to selectively record a television program for later viewing.

Cable gateway devices have the capability to communicate with the CATV headend generally in the (lower) CATV frequency band and to communicate with MoCA devices in the (higher) MoCA frequency band. Accordingly, such cable gateway devices permit information that is transmitted through a public CATV system to be shared amongst MoCA devices joined in a private network within a commercial or residential building. Typical gateway devices permit CATV signals received in the CATV frequency band to be rebroadcast in the MoCA frequency band via connections controlled through (typically digital) logic means, completely avoiding the use of physical switching or movement of cables between ports.

However, it is important that MoCA systems keep the CATV input signals isolated from the MoCA signals within the system. Conventional MoCA gateway splitters isolate CATV input signals from MoCA signals using a filter.

FIG. 1 is a diagram of a gateway splitter 100 that includes a conventional hybrid power splitter.

As shown in FIG. 1, the gateway splitter 100 includes a CATV input port 110 for receiving a CATV input signal from a CATV headend, a gateway port 120 that is connectable to a gateway device, and a number of MoCA ports 180 that are each connectable to a MoCA device. The MoCA ports 180 are connected via a resistive splitter 170 that includes resistors 172 and a common resistive splitter node 174. The gateway port 120 is connected to a hybrid splitter 150, which is connected to the CATV input port 110 and the MoCA ports 180 (via the resistive splitter 170).

The gateway splitter 100 enables the gateway device connected to the gateway port 120 to function as a media server and communicate with both the (broader) CATV network and (local) MoCA network over two separate bandwidths. The CATV network is connected to one branch of the hybrid splitter 150 and the MoCA network is connected to the other branch of the hybrid splitter 150. The CATV input port 110 receives the (lower frequency) CATV input signal from a CATV headend, which is distributed to a gateway device connected to the gateway port 120. The gateway splitter 100 also allows the gateway device that is connected to the gateway port 120 to bidirectionally communicate with the CATV headend in the CATV frequency band. The gateway splitter 100 also allows the gateway device connected to the gateway port 120 to bidirectionally communicate with MoCA devices connected to the MoCA ports 180 in the (higher frequency) MoCA frequency band. The gateway device connected to the gateway port 120 can then act as a server that bidirectionally communicates with the CATV headend in the (lower frequency) CATV frequency band and the MoCA devices connected to the MoCA ports 180 can act as client devices that bidirectionally communicate with the gateway device connected to the gateway port 120.

One benefit of the topology shown in FIG. 1 is that the gateway splitter 100 is not frequency dependent, meaning each network can be any bandwidth. The disadvantage of the topology shown in FIG. 1 is the power inefficiency because each branch of the hybrid splitter 150 has a 3-dB loss. Also, network isolation is limited to the phase cancellation across the branches of the hybrid splitter 150, which is generally insufficient to meet the isolation requirements of the CATV frequency band.

FIG. 2 is a diagram of a prior art gateway splitter 200 that includes a diplex filter.

As shown in FIG. 2, the gateway splitter 200 also includes a CATV input port 110, a gateway port 120, and a number of MoCA ports 180 (connected via a resistive splitter 170 that includes resistors 172 a common resistive splitter node 174). The gateway port 120 is connected to the common node of a diplex filter 250 that includes a low-pass filter section 252 and a high-pass filter section 258. The low-pass filter section 252 is connected to the CATV input port 110 and the high-pass filter section 258 is connected to the MoCA ports 180 via the resistive splitter 170. The low-pass filter section 252 is tuned to allow the gateway port 120 to communicate bidirectionally with the CATV input port 110 in the lower CATV frequency band. Meanwhile, the high-pass filter section 258 is tuned to allow the gateway port 120 to communicate bidirectionally with the MoCA ports 180 in the higher MoCA frequency band. An example of the topology shown in FIG. 2 is FIG. 8 of U.S. Pat. No. 8,752,114 to Shapson.

A benefit of the topology shown in FIG. 2 is that the CATV network is effectively isolated from the MoCA network by the filter. Another benefit is that the power is not divided between the two networks because the through-loss of the lower and higher frequency bands through the diplex filter 250 is typically less than 1 dB. The disadvantage of the topology shown in FIG. 2 is that the frequency band split is hard wired. If the bandwidth allocations of the CATV and MoCA networks change, new products need to be designed, developed, and deployed to all of the residences and businesses using the prior art gateway splitters 200.

Until recently, the CATV frequency band was specified as 5 to 1002 MHz and the MoCA frequency band was specified as 1125 to 1675 MHz. However, the recent Data Over Cable Service Interface Specification (DOCSIS) 3.1 standard specifies a CATV frequency band of 5 to 1218 MHz and a MoCA frequency band of 1275 to 1675 MHz. As a result, all of the existing prior art gateway splitters 200 deployed in residential and commercial buildings will need to be replaced to comply with the new DOCSIS 3.1 standard and provide interaction between DOCSIS 3.1-compliant devices.

Accordingly, there is a need for a MoCA splitter that provides a gateway port with access to both a CATV network and a MoCA network with minimal attenuation while isolating the MoCA network from the CATV network without relying on internal filters with hard-wired frequency cutoffs to isolate the MoCA network from the CATV network.

SUMMARY

An aspect of this disclosure is a "universal" Multimedia over Coax Alliance (MoCA) gateway splitter that includes a directional coupler (including a first transmission path coupled to a second transmission path), a gateway port electrically connected to the first transmission path, a cable television (CATV) input port electrically connected to the first transmission path, and a MoCA port electrically connected to the second transmission path, which is terminated to ground so that the MoCA port is isolated from the CATV input port and coupled to the gateway port.

In some examples, multiple MoCA ports may be electrically connected to the second transmission path (e.g., via a resistive splitter). In some embodiments, the universal MoCA gateway splitter may include multiple (e.g., two or three) gateway ports, each electrically connected to the CATV input port via a directional coupler (and, e.g., one or more hybrid splitters). In those embodiments, the coupled line of each directional coupler may be electrically connected to the MoCA port(s), for example, via a common microstrip node.

Another aspect of this disclosure is a method of making a universal MoCA gateway splitter, the method including electrically connecting a gateway port to a first transmission path of a directional coupler (having a second transmission path that is coupled to the first transmission path), electrically connecting a CATV input port to the first transmission path, and electrically connecting a MoCA port to the second transmission path such that the MoCA port is isolated from the CATV input port and coupled to the gateway port.

In some examples, the method may include electrically connecting multiple MoCA ports to the second transmission path (e.g., via a resistive splitter). In some applications, the method may further include terminating the second transmission path. In some embodiments, the method may further include electrically connecting multiple (e.g., two or three) gateway ports to the CATV input port, each via a directional coupler (and, e.g., one or more hybrid splitters). In those embodiments, the method may further include electrically connecting each of the directional couplers to the MoCA port(s), for example, via a common microstrip node.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1:
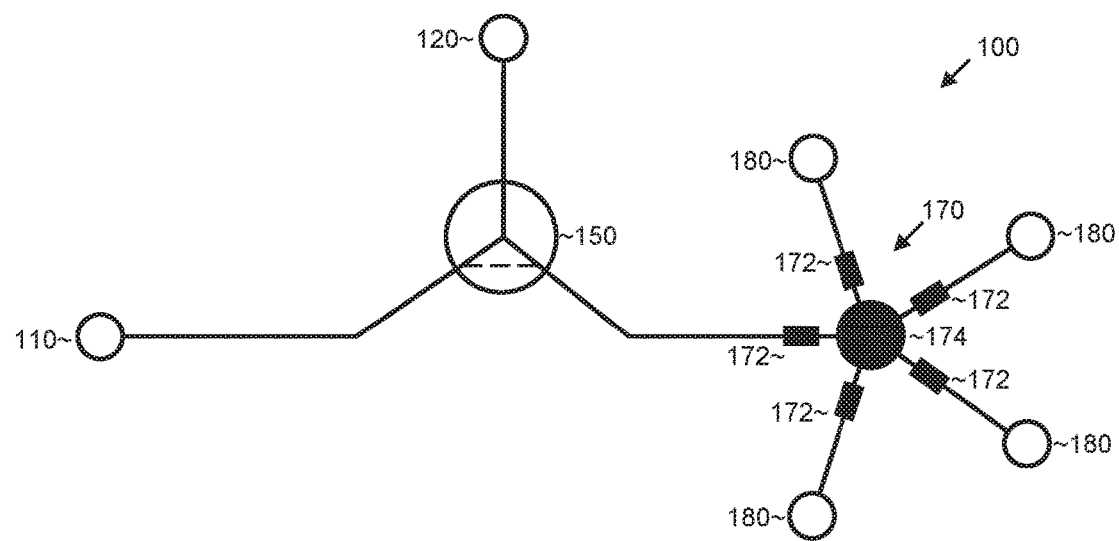
FIG. 1 is a diagram of a gateway splitter that includes a conventional hybrid power splitter.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Disclosed is a universal Multimedia over Coax Alliance (MoCA) gateway splitter that includes a directional coupler (including a first transmission line and a second transmission line), a gateway port electrically connected to the first transmission line, a cable television (CATV) input port electrically connected to the first transmission line, and a MoCA port electrically connected to the second transmission line, which is terminated to ground, so that the MoCA port is isolated from the CATV input port and coupled to the gateway port. In some examples, multiple MoCA ports may be electrically connected to the second transmission line (e.g., via a resistive splitter). In some embodiments, the universal MoCA gateway splitter may include multiple (e.g., two or three) gateway ports, each electrically connected to the CATV input port via a directional coupler (and, e.g., one or more hybrid splitters). In those embodiments, each directional coupler may be electrically connected to the MoCA port(s), for example, via a common microstrip node.

Figure 3:
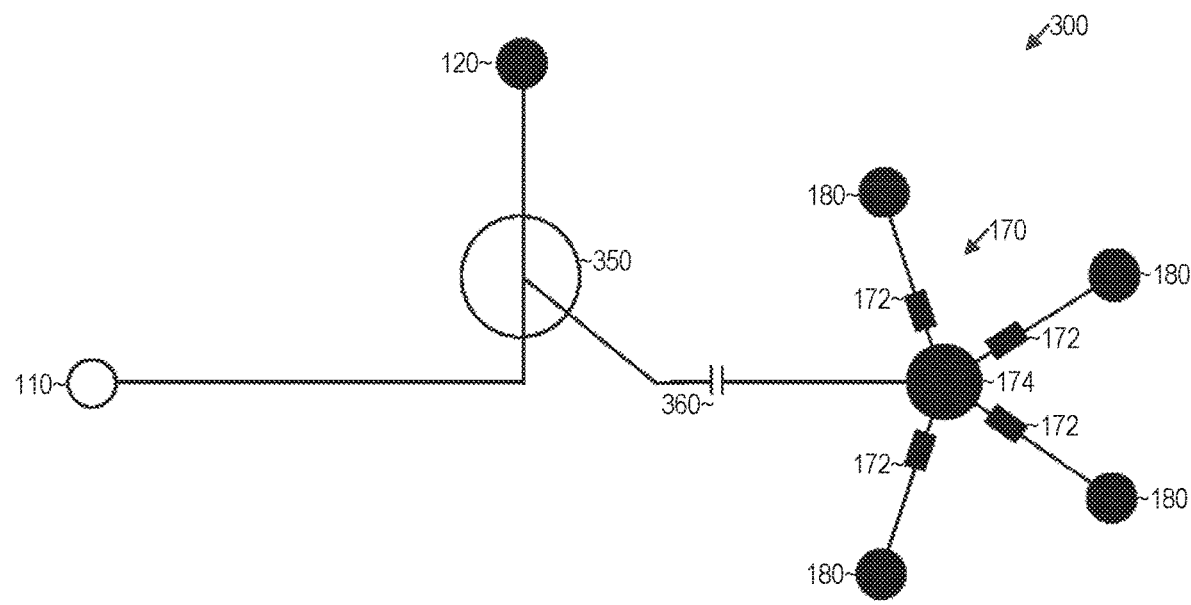
FIG. 3 is a diagram of a universal MoCA gateway splitter that includes a directional coupler according to an exemplary embodiment.

FIG. 3 is a diagram of a universal MoCA gateway splitter 300 according to an exemplary embodiment.

As shown in FIG. 3, the gateway port 120 of the universal MoCA gateway splitter 300 is connected to the CATV input port 110 via a directional coupler 350. Meanwhile, the gateway port 120 is connected to the resistive splitter 170 via the directional coupler 350 and high-pass coupling 360. As described in detail below, the universal MoCA gateway splitter 300 avoids the frequency dependence of built-in filters while preserving throughput efficiency between the CATV input port 110 and the gateway port 120 by broadly directing gateway signals in the MoCA frequency band to the MoCA ports 180 and away from the CATV input port 110.

In some embodiments, the directional coupler 350 uses coupled transmission paths. Transmission paths are "coupled" when they are arranged in close enough proximity that energy from one path passes to the other path. In some embodiments, the directional coupler 350 is a microstrip directional coupler that uses coupled transmission lines. A microstrip directional coupler is a stable and reliable manufacturing technique suitable for high-volume production at low cost.

Figure 4:
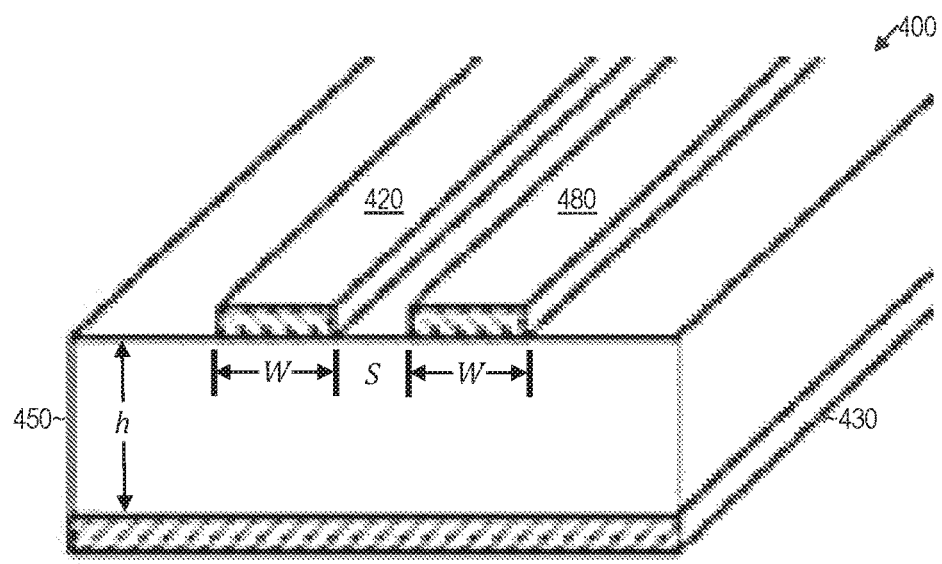
FIG. 4 is a cross-sectional view of a coupled microstrip transmission lines according to an exemplary embodiment.

FIG. 4 is a cross-sectional view of a coupled microstrip transmission lines 400 according to an exemplary embodiment.

As shown in FIG. 4, the coupled microstrip transmission lines 400 may include a first microstrip transmission line 420 of width W patterned on a substrate 450 of height hon top of a ground plane 430. The first microstrip transmission line 420 is coupled to a second microstrip transmission line 480, also of width W, which is also patterned on the substrate 450. In the embodiment shown, the first transmission line 420 and second transmission line 480 are elongated, thin, and rectangular in shape. In addition, the first microstrip transmission line 420 and the second microstrip transmission line 480 each have a respective longitudinal axis and longitudinal sides. The longitudinal axis and sides of the first and second transmission lines 420, 480 extend substantially parallel to one another at the top surface of the substrate 450 and are separated by a distance S. While the first microstrip transmission line 420 and the second microstrip transmission line 480 can be any length, the portions of the first microstrip transmission line 420 and the second microstrip transmission line 480 that are in close proximity (i.e., separated by the distance S) each have a length L as described below.

The simplicity of the coupled microstrip transmission lines 400 provides a number of benefits. On a conventional circuit board, the microstrip design functions best at frequencies above 1 GHz. A high-frequency directional coupler can be constructed entirely within the circuit board layout by controlling the width W of the microstrip transmission lines 420 and 480, the distance S between the microstrip transmission lines 420 and 480, and the length L of the portions of the microstrip transmission lines 420 and 480 that are in close proximity.

Figure 5:
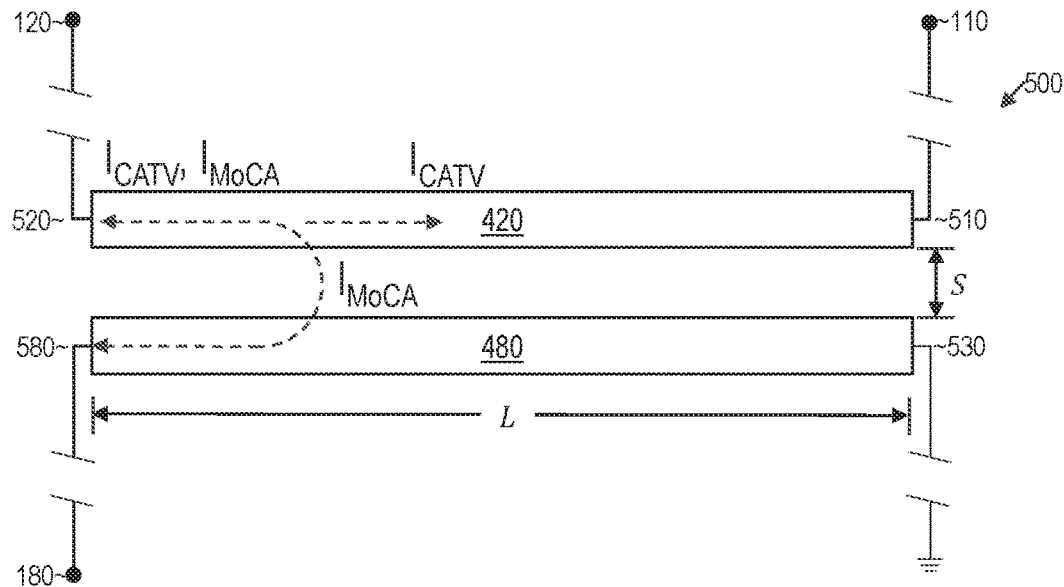
FIG. 5 is a top view of the coupled microstrip transmission lines of FIG. 4 forming a directional coupler according to an exemplary embodiment.

FIG. 5 is a top view of the coupled microstrip transmission lines 400 of FIG. 4 forming a directional coupler 500 according to an exemplary embodiment.

As shown in FIG. 5, the directional coupler 500 includes an input port 520 and an output port 510 at opposing transverse ends of the first microstrip transmission line 420 and a tap port 580 and an isolated port 530 at opposing transverse ends of the second microstrip transmission line 480. The tap port 580 of the second microstrip transmission line 480 is proximate (i.e., separated by the distance S) the input port 520 of the first microstrip transmission line 420. The isolated port 530 is proximate (i.e., separated by the distance S) the output port 510 of the first microstrip transmission line 420.

Microstrip couplers (like the directional coupler 500) function as "reverse" couplers. Energy propagating in a wave on the first microstrip transmission line 420 excites a wave in the adjacent second microstrip transmission line 480 that is coupled to the first microstrip transmission line 420 by the electromagnetic energy induced in the shared dielectric medium between them. Energy propagating from the input port 520 to the output port 510 on the first transmission line 420 excites a wave in the opposite direction (i.e., to the tap port 580). The first microstrip transmission line 420 provides the input port 520 with a direct electrical connection to the output port 510. The directional propagation of energy along the first microstrip transmission line 429 of the directional coupler 500 couples the tap port 580 to the input port 520 and isolates the tap port 580 from the output port 510. The isolated port 530 of the directional coupler 500 is terminated (with a resistor and parallel capacitor as described below) so that signal currents to and from the tap port 580 are generated through the coupling of the two microstrip transmission lines 420 and 480.

The gateway port 120 is electrically connected to the input port 520 (e.g., by a coaxial cable or other line). The CATV input port 110 is electrically connected to the output port 510 (e.g., by a coaxial cable or other line). And the MoCA ports 180 are connected (via the resistive splitter 170 and the high pass coupling 360) to the tap port 580 (e.g., by coaxial cables or other lines). The first microstrip transmission line 420 provides the gateway device (connected to the input port 520) with a direct and efficient connection to the CATV network (connected to the output port 510). The directivity of the directional coupler 500 couples the MoCA devices (connected to the tap port 580) to the gateway device (connected to the input port 520) and isolates the MoCA devices (connected to the tap port 580) from the CATV network (connected to the output port 510).

As shown in FIG. 5, the first microstrip transmission line 420 provides a direct bidirectional signal path for CATV signals ($I_{CATV}$) between the CATV input port 110 (via the output port 510) and the gateway port 120 (via the input port 520). Meanwhile, as described above, the directional coupler 500 couples the tap port 580 to the input port 520, providing an efficient, bidirectional signal path for MoCA signals ($I_{MOCA}$) between the gateway port 120 (via the input port 520) and the MoCA ports 180 (via the tap port 580).

One of the characteristics of the directional coupler 500 is that the second microstrip transmission line 480 only couples to the first microstrip transmission line 420 at frequencies approaching 1 GHz with a bandpass type of response. The bandpass is designed according to the ¼ wavelength of the center frequency of the passband. In the case of the MoCA frequency band, the center frequency between 1125 and 1675 MHz is 1400 MHz. The wavelength of 1400 MHz on FR4 type printed circuit board material is about 100 millimeters. Therefore, the directional coupler 500 may be created by printing microstrip transmission lines 420 and 480 that travel in close proximity (i.e., separated by the distance S) for a distance L of 25 millimeters, which is approximately ¼ of the wavelength of the center frequency of the MoCA frequency band. Therefore, the directional coupler 500 directs signals in the MoCA frequency band between the MoCA ports 180 and the gateway port 120 instead of to the CATV system at the CATV input port 110. Meanwhile, the frequency response of the tap port 580 drops off above and below the center frequency of the passband (in this instance, the MoCA frequency band). Therefore, the directional coupler 500 does not divert significant power in the CATV frequency band from the through path along the first transmission line 420, optimizing the throughput of CATV signals between the CATV input port 110 and the gateway port 120. The directional coupler 500 allows the universal MoCA gateway splitter 300 to accommodate different band-split frequency allocations (e.g., 1 GHz and 1.2 GHz, which are typical of current CATV distribution systems). The directional coupler 500 also eliminates the need for the universal MoCA gateway splitter 300 to include filters (like the low-pass filter section 252 and high-pass filter section 258 of the prior art gateway splitter 200) by isolated the CATV input port 110 from the MoCA ports 180 using only the bandwidth limitations and directivity of the directional coupler 500.

In the embodiment shown in FIGS. 4-5, the coupling efficiency is controlled primarily by designating the spacing between the coupled microstrip transmission lines 420 and 480. Referring back to FIGS. 4 and 5, the coupling and the bandwidth of the directional coupler 500 are determined by the length L of the microstrip transmission lines 420 and 480, which may be equal to ¼ of the wavelength of the median frequency of the MoCA frequency band, the width W of the microstrip transmission lines 420 and 480, which determines the characteristic impedance of the microstrip transmission lines 420 and 480, and the distance S of the microstrip transmission lines 420 and 480, which determines the degree of coupling between the microstrip transmission lines 420 and 480. However, there are several methods of arranging the coupled lines One example is the Lange Interdigitated Strip Line coupler (see U.S. Pat. No. 3,516,024, which is hereby incorporated by reference). The coupled bandwidth can be extended by adding more coupled sections as is done in higher order discrete-component band pass filters.

Figure 6:
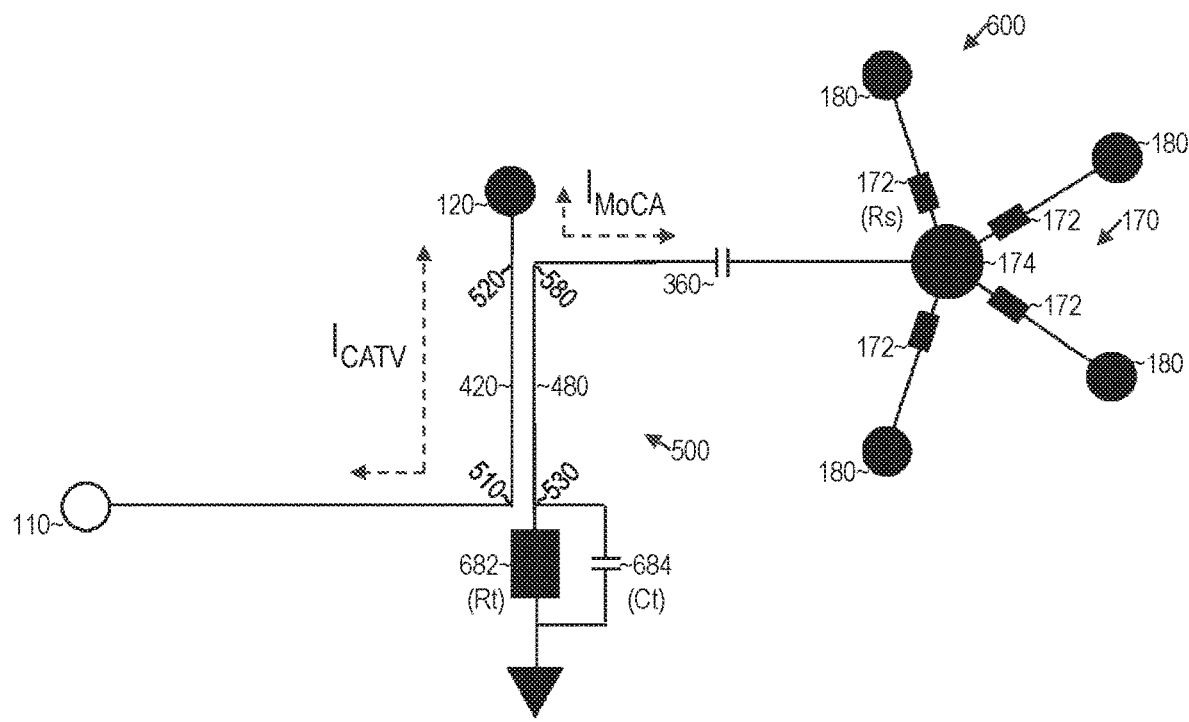
FIG. 6 is a diagram of a universal MoCA gateway splitter that combines the universal MoCA gateway splitter of FIG. 3 with the directional coupler of FIG. 5 according to an exemplary embodiment.

FIG. 6 is a diagram of a universal MoCA gateway splitter 600, which combines the universal MoCA gateway splitter 300 of FIG. 3 with the directional coupler 500 of FIG. 5 according to an exemplary embodiment.

As shown in FIG. 6 and described above, the CATV input port 110 is electrically connected to the output port 510 of the first microstrip transmission line 420 of the directional coupler 500, the gateway port 120 is electrically connected to the input port 520 of the first microstrip transmission line 420 of the directional coupler 500, the MoCA ports 180 are connected (via the resistive splitter 170) to the tap port 580 of the second microstrip transmission line 480 of the directional coupler 500, and the isolated port 530 of the directional coupler 500 is terminated with a resistor 682 and parallel capacitor 684 so that signal currents to and from the tap port 580 are generated through the coupling of the two microstrip transmission lines 420 and 480. The tap port 580 may be electrically connected to the resistive splitter 170 via high-pass coupling 360. As described below, each of the resistors 172 in the resistive splitter 170 has a resistance Rs, the termination resistor 682 has a termination resistance Rt and the capacitor 684 has a termination capacitance Ct.

In some embodiments, it may be beneficial to provide multiple gateway ports 120 to accommodate multiple gateway devices. Prior art MoCA splitters provide multiple gateway or modem ports by using a hybrid splitter to connect those gateway/modem ports to a common node (e.g., the common node of a diplex filter). Hybrid splitters are necessary to provide bidirectional signal connectivity between multiple gateway ports and the CATV input port since CATV band frequencies extend from 1 GHz to as low as 5 MHz. However, as described above, a hybrid splitter introduces power inefficiency as each branch of the hybrid splitter has a 3-dB loss. This is unavoidable when splitting the total power of the CATV bandwidth between the CATV input port and multiple gateway ports. Accordingly, there is a need to provide a MoCA gateway splitter having multiple gateway ports 120 without introducing hybrid splitter losses between the gateway ports 120 and the MoCA ports 180.

Figure 7:
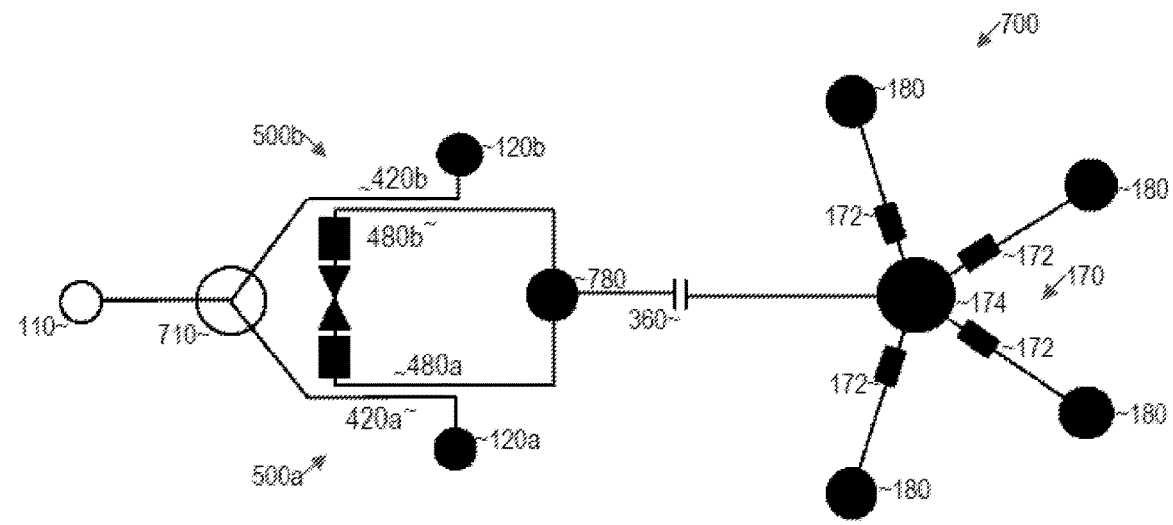
FIG. 7 is a diagram of a universal MoCA gateway splitter that provides multiple gateway ports by connecting multiple directional couplers to a common microstrip node according to an exemplary embodiment.

FIG. 7 is a diagram of a universal MoCA gateway splitter 700 that provides multiple gateway ports 120 by connecting multiple directional couplers 500 between each gateway port 120 and a common microstrip node 780 according to an exemplary embodiment.

As shown in FIG. 7, the universal MoCA gateway splitter 700 includes a first gateway port 120a that is connected to the CATV input port 110 via a first microstrip transmission line 420a of a first directional coupler 500a. The first microstrip transmission line 420a of the first directional coupler 500a provides a direct and efficient connection between a first gateway device (connected to the first gateway port 120a) and the CATV network (connected to the CATV input port 110) as described above. The first directional coupler 500a also includes a second microstrip transmission line 480a, which directs MoCA frequency band signals to and from the first gateway port 120a to a common microstrip node 780, which is electrically connected to the MoCA ports 180 via the resistive splitter 170 (as described above with reference to FIGS. 3 and 6). The second microstrip transmission line 480a of the first directional coupler 500a is terminated with a resistor 682 and parallel capacitor 684 (as shown and described above with reference to FIG. 6).

The universal MoCA gateway splitter 700 also includes a second gateway port 120b that is connected to the CATV input port 110 via a first microstrip transmission line 420b of a second directional coupler 500b. Again, the first microstrip transmission line 420b of the second directional coupler 500b provides a direct and efficient connection between a second gateway device (connected to the second gateway port 120b) with the CATV network (connected to the CATV input port 110). The second directional coupler 500b also includes a second microstrip transmission line 480b, which directs MoCA frequency band signals to and from the second gateway port 120b to the MoCA ports 180 via the common microstrip node 780. While not labeled in FIG. 7, the second microstrip transmission line 480b of the first directional coupler 500b is also terminated with a resistor 682 and parallel capacitor 684 (as shown and described above with reference to FIG. 6).

The CATV input port 110 may be electrically connected to the first microstrip transmission lines 420a and 420b of both directional couplers 500a and 500b via a hybrid splitter 710. While each branch of the hybrid splitter 710 has a 3-dB loss in the CATV frequency band, this loss increases as frequencies extend into the MoCA frequency band. Therefore, while it might seem advantageous to place a single directional coupler between the CATV input port 110 and the input of the hybrid splitter network 710 serving the gateway ports 120, MoCA signals originating from the gateway ports 120 and bound for the MoCA ports 180 would be attenuated by the inefficiency of the hybrid splitters 710 at these frequencies. The connection between the outputs of the hybrid splitter 710 and the gateway ports 120 of the universal MoCA gateway splitter 700, by contrast, are transmission lines that can couple the MoCA signals more directly by coupling each line 480 to a common node 780 connected to the input of the MoCA splitter 170.

As more gateway ports 120 are added to support more gateway devices, each gateway port 120 is coupled (via a directional coupler 500) to the common microstrip node 780. Since directional couplers 500 function in the MoCA frequency band, the common microstrip node 780 serves to reduce the natural port-to-port isolation characteristic of hybrid splitters 710 above the CATV frequency band by providing a high-frequency shunt path across the outputs of the hybrid splitter 710. This is a requirement common to MoCA networks, where each MoCA port 180 is able to communicate bilaterally with any other MoCA port 180 and any gateway port 120.

The resistors 172 situated between the MoCA ports 180 and the common resistive splitter node 174 determine the insertion loss from any MoCA port 180 to any other MoCA port 180 are calculated to ensure that each MoCA port 180 has a 75-ohm impedance when terminated with 75 ohms. The termination resistance Rt of the coupled second microstrip transmission lines 480a and 480b, when combined in parallel, may be equivalent to the resistance Rs of the resistors 172 in the resistive splitter 170.

The example resistive splitter 170 shown in FIG. 7 is a 5-port resistive splitter. In order to achieve 75-ohm impedance at every port and equal insertion loss to each port, the resistance Rs of each resistor 172 connected to each MoCA port 180 may be 50 ohms, yielding an insertion loss of 14 dB from one MoCA port 180 to another. The termination resistance Rt of the coupled second microstrip transmission lines 480a and 480b may be calculated to be 100 ohms (to equal the 50-ohm source impedance of the other ports). In practice, however, lower insertion loss is favored over 75-ohm impedance in the MoCA frequency band. Therefore, the resistance Rs of the resistors 172 may be 33 ohms. Similarly, the termination resistance Rt of the coupled second microstrip transmission lines 480a and 480b influences the insertion loss between the gateway ports 120 and the MoCA ports 180. In practice, impedance match at the MoCA ports 180 is traded-off for lower insertion loss, so the resistance Rt of each of the second microstrip transmission lines 480a and 480b may be 43 ohms and the termination capacitance Ct (as shown in FIG. 6) may be 1.2 picofarads in parallel to emphasize the higher frequencies, which are affected more by printed circuit losses.

The common microstrip node 780 is coupled to the common resistive splitter node 174 through a small capacitor that operates as a high pass coupler 360 that serves to limit the lower end of the MoCA passband. It further limits the lower frequency of the effective band-pass characteristic of the directional coupler to meet the CATV-to-MoCA insertion loss specifications in the CATV frequency band. The capacitance value of the capacitor 360 in this example may be 1.3 picofarads. Two capacitors in series may be used to achieve the precise amount of roll-off at the lower end of the MoCA frequency band. A printed capacitor is another alternative to reduce components with consistent results.

Figure 8:
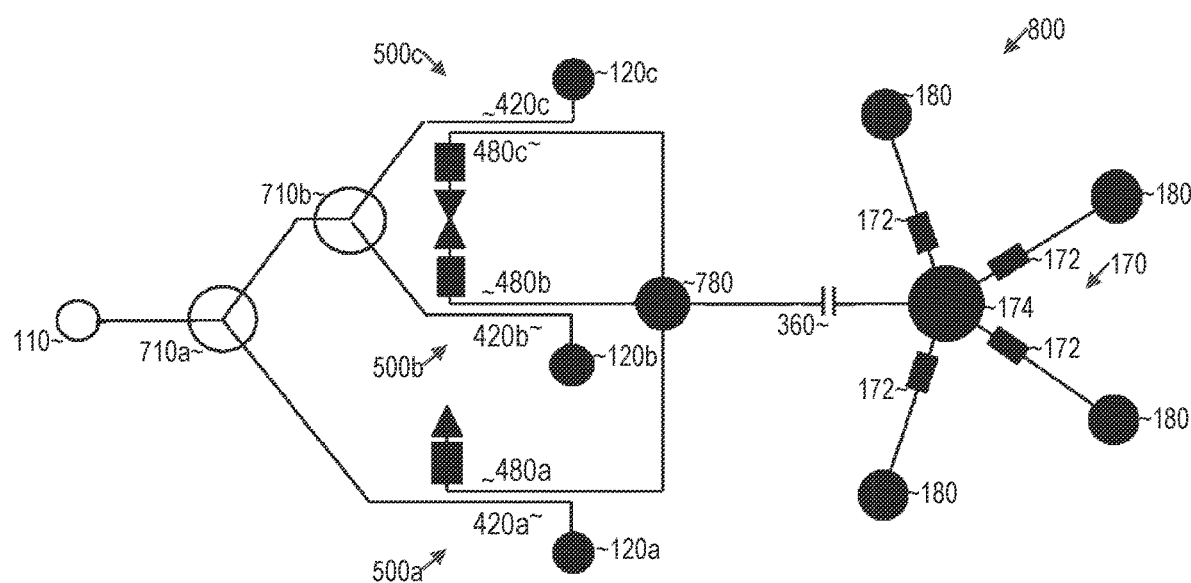
FIG. 8 is a diagram of a universal MoCA gateway splitter that provides three gateway ports according to an exemplary embodiment.

FIG. 8 is a diagram of a universal MoCA gateway splitter 800 that provides three gateway ports 120 according to an exemplary embodiment.

As shown in FIG. 8, the universal MoCA gateway splitter 800 includes a first gateway port 120a electrically connected to the CATV input port 110 via a first microstrip transmission line 420a of a first directional coupler 500a (and a hybrid splitter 710a), a second gateway port 120b electrically connected to the CATV input port 110 via a first microstrip transmission line 420b of a second directional coupler 500b (and hybrid splitters C710a and 71b), and a third gateway port 120c electrically connected to the CATV input port 110 via a first microstrip transmission line 420c of a third directional coupler 500c (and the hybrid splitters 710a and 71b). Each of the three directional couplers 400a-c also include a second transmission line 480a-c electrically connected to the MoCA ports 180 via a common microstrip node 780.

By combining all of the MoCA frequency band signals from the gateway ports 120 at a single microstrip node 780, the number of splitter ports is minimized, which yields the lowest attenuation from each MoCA port 180 to another MoCA port 180. The number of MoCA ports 180 provided by the universal MoCA gateway splitter 800 can be increased (e.g., to 6 or 8) by connecting each of the MoCA ports 180 to the common resistive splitter node 174 and adjusting the resistance Rs of the resistors 172. If eight MoCA ports 180 are provided, for example, the resistive splitter 170 would include nine branches. Rs may then be calculated to be 60 ohms and Rt of the resistors terminating the second microstrip transmission lines 480a-b may then be calculated to be 180 ohms. In practice, Rt will be chosen empirically to meet the specification for attenuation from the gateway ports 120 to the MoCA ports 180 and the resistance Rs of the resistors 172 will be chosen to reduce the loss between MoCA ports 180. For example, a typical industry specification for port-to-port loss in the MoCA frequency band is as follows:

| Access Network Port to Home Network Port or Home Network Port to | MoCA Band Maximum Output Port to Output Port Isolation, 1125-1675 MHZ MUST not exceed the following values: |
| --- | --- |

-continued

| Home Network Port isolation | 7-way, Access Network Port to Home Network Port isolation ≤28 dB<br>7-way, Home Network Port to Home Network isolation ≤16 dB<br>11-way, Access Network Port to Home Network isolation ≤31 dB<br>11-way, Home Network Port to Home Network isolation ≤22 dB |
|---|---|

This example specification designates a device with 4 MoCA ports and 3 Gateway ports as a 7-way device. Similarly, 8 MoCA ports and 3 Gateway ports is an 11-way device.

Figure 9:
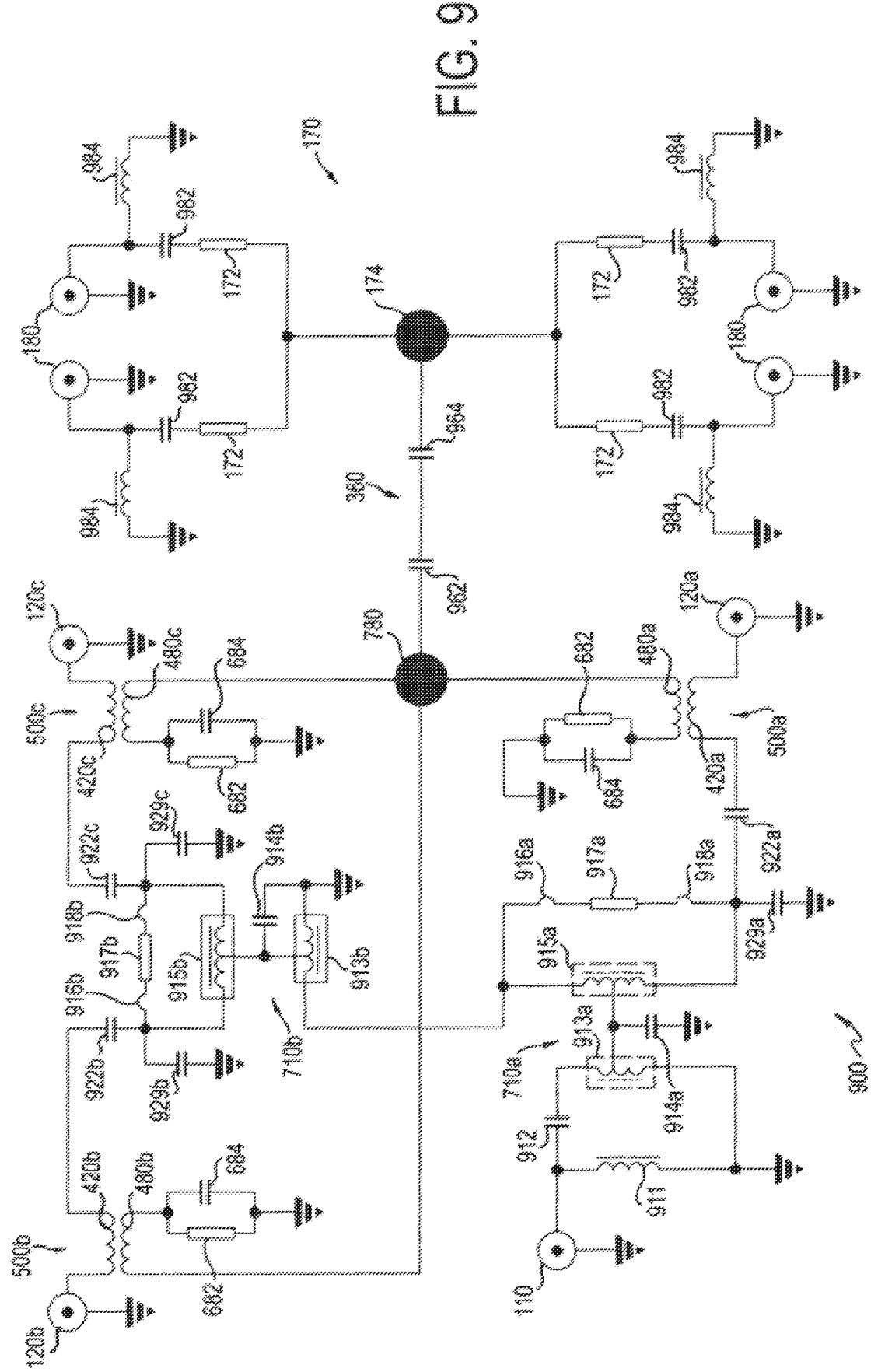
FIG. 9 is a schematic diagram of a practical embodiment of a universal MoCA gateway splitter having three gateway ports and four MoCA ports.

FIG. 9 is a schematic diagram of a practical embodiment of a universal MoCA gateway splitter 900 having three gateway ports 120 and four MoCA ports 180.

Like the MoCA gateway splitter 800, the universal MoCA gateway splitter 900 includes a CATV input port 110 electrically connected to a first gateway port 120a (via a hybrid splitter 710a), a second gateway port 120b (via the hybrid splitter 710a and another hybrid splitter 710b), and a third gateway port 120c (via the hybrid splitters 710a and 710b). The universal MoCA gateway splitter 900 also includes MoCA ports 180 electrically connected to a common microstrip note 780 via resistive splitter 170 that includes resistors 172 and a common restive splitter node 174.

Like the MoCA gateway splitter 800, the CATV input port 110 of the universal MoCA gateway splitter 900 is electrically connected to the first gateway port 120a via a first microstrip transmission line 420a of a first directional coupler 500a, to the second gateway port 120b via a first microstrip transmission line 420b of a second directional coupler 500b, and to the third gateway port 120c via a first microstrip transmission line 420c of a third directional coupler 500c. The first directional coupler 500a includes a second microstrip transmission line 480a in close proximity to (e.g., separated by a distance S of 0.25 millimeters) and coupled to the first microstrip transmission line 420a, with one port terminated with a resistor 682 and a capacitor 684 in parallel and the other port electrically connected to the common microstrip node 780. Similarly, the second directional coupler 500b includes a second microstrip transmission line 480b, in close proximity to (e.g., separated by a distance S of 0.25 millimeters) and coupled to the first microstrip transmission line 420b, with one port terminated with a resistor 682 and a capacitor 684 in parallel and the other port electrically connected to the common microstrip node 780. Finally, the third directional coupler 500c also includes a second microstrip transmission line 480c, in close proximity to (e.g., separated by a distance S of 0.25 millimeters) and coupled to the first microstrip transmission line 420c, with one port terminated with a resistor 682 and a capacitor 684 in parallel and the other port electrically connected to the common microstrip node 780. The resistance of each of the resistors 682 may be 43 ohms and the capacitance of each of the capacitors 684 may be 1.2 picofarads.

As shown in FIG. 9, the CATV input port 110 is electrically connected to the first hybrid splitter 710a via a choke 911 that shunts the direct current path immediately to ground for surge protection. CATV signals above 5 MHz can pass without attenuation from the CATV input port 110 to the hybrid splitter 710a through a high-pass filter consisting of the choke 911 and a high-voltage capacitor 912. The inductance of the choke 911 may be 7.5 microhenries. The capacitance of the high-voltage capacitor 912 may be 820 picofarads.

The hybrid splitter 710a may include a matching transformer 913a and a center tapped transformer 915a. A capacitor 914a may compensate for the rising impedance at high frequencies due to the inductance of the path between the two transformers 913a and 915a. Isolation through phase cancellation across the outputs of the center tapped transformer 915a may be provided by a shunt path that includes a resistor 917a and two inductors 916a and 918a at each end of the resistor 917a. The matching transformer 913a may be a 2-turn to 5-turn matching transformer. The center tapped transformer 915a may be 2-turn to 2-turn center tapped transformer. Both of the transformers 913a and 915a may be wound on ferrite bead cores. The capacitance of the capacitor 914a may be 1 picofarad. The resistance of the resistor 917a may be 200 ohms. The inductance of each of the inductors 916a and 918a may be 5.6 nanohenries.

The first output of the hybrid splitter 710a may be electrically connected to the first transmission line 420a of the first directional coupler 500a via a high-voltage capacitor 922a. A capacitor 929a may compensate for the rising impedance at high frequencies due to the inductance of the path from the first output of the hybrid splitter 710a to the high-voltage capacitor 922a. The capacitance of the high-voltage capacitor 922a may be 2.2 nanofarads. The capacitance of the capacitor 929a may be 0.75 picofarads.

The second hybrid splitter 710b may also include a matching transformer 913b and a center tapped transformer 915b. Again, a capacitor 914b may compensate for the rising impedance at high frequencies due to the inductance of the path between the two transformers 913b and 915b. And isolation through phase cancellation across the outputs of the center tapped transformer 915b may be provided by a shunt path that includes a resistor 917b and two inductors 916b and 918b at each end of the resistor 917b. The matching transformer 913b may be a 2-turn to 5-turn matching transformer. The center tapped transformer 915b may be 2-turn to 2-turn center tapped transformer. Both of the transformers 913b and 915b may be wound on ferrite bead cores. In this instance, the capacitance of the capacitor 914b may be 0.2 picofarads, the resistance of the resistor 917b may be 167 ohms, and the inductance of each of the inductors 916b and 918b may be 3.9 nanohenries.

The first output of the second hybrid splitter 710b may be electrically connected to the first transmission line 420b of the second directional coupler 500b via a high-voltage capacitor 922b. A capacitor 929b may compensate for the rising impedance at high frequencies due to the inductance of the path from the first output of the hybrid splitter 710b to the high-voltage capacitor 922b. The capacitance of the high-voltage capacitor 922b may be 2.2 nanofarads. In this instance, the capacitance of the capacitor 929b may be 0.3 picofarads.

The second output of the second hybrid splitter 710b may be electrically connected to the first transmission line 420c of the third directional coupler 500c via a high-voltage capacitor 922c. A capacitor 929c may compensate for the rising impedance at high frequencies due to the inductance of the path from the second output of the hybrid splitter 710b to the high-voltage capacitor 922c. The capacitance of the high-voltage capacitor 922c may be 2.2 nanofarads and the capacitance of the capacitor 929c may be 0.3 picofarads.

The common microstrip node 780 may be electrically connected to the common resistive splitter node 174 via high-pass coupling 360. The high-pass coupling 360 may include a capacitor 962 and a capacitor 964. The capacitance of the capacitor 962 may be 1.5 picofarads and the capacitance of the capacitor 964 may be 12 picofarads. Alternatively, the equivalent capacitance of the two capacitors 962 and 964 in series may be realized in the circuit board layout by printing two pads coupled by the dielectric of the printed circuit board substrate.

Each of the four MoCA ports 180 may be connected to the common resistive splitter node 174 through a high-voltage capacitor 982 in series with the resistor 172. An inductor 984 may be connected from each MoCA port 180 to ground for surge protection. Each capacitor 982 may be 1 nanofarad. Each resistor 172 may be 33 ohms. And each inductor 984 may be a 7.5-turn air-core inductor.

While the gateway splitters 600-900 are described above as including the microstrip directional coupler 500 with coupled microstrip transmission lines 400, one of ordinary skill in the art would recognize the gateway splitter 300 may instead include another type of directional coupler (e.g., a strip line coupler, a coaxial coupler, or a hybrid transformer directional couplers). Features identified above with reference to each embodiment may then be combined to provide any of the specific benefits described in this disclosure or otherwise known in the art.

Problems Identified in the Prior Art

Since the bandwidth of the CATV system is still expanding, the objective of the CATV system operator is to be able to use this device in various systems whether they have an upper CATV bandwidth of 1002 MHz and a lower MoCA bandwidth of 1125 MHz or, alternatively, for more advanced bandwidth structures that typically have an upper CATV bandwidth of 1218 MHz and a lower MoCA bandwidth of 1275 MHz.

Figure 2:
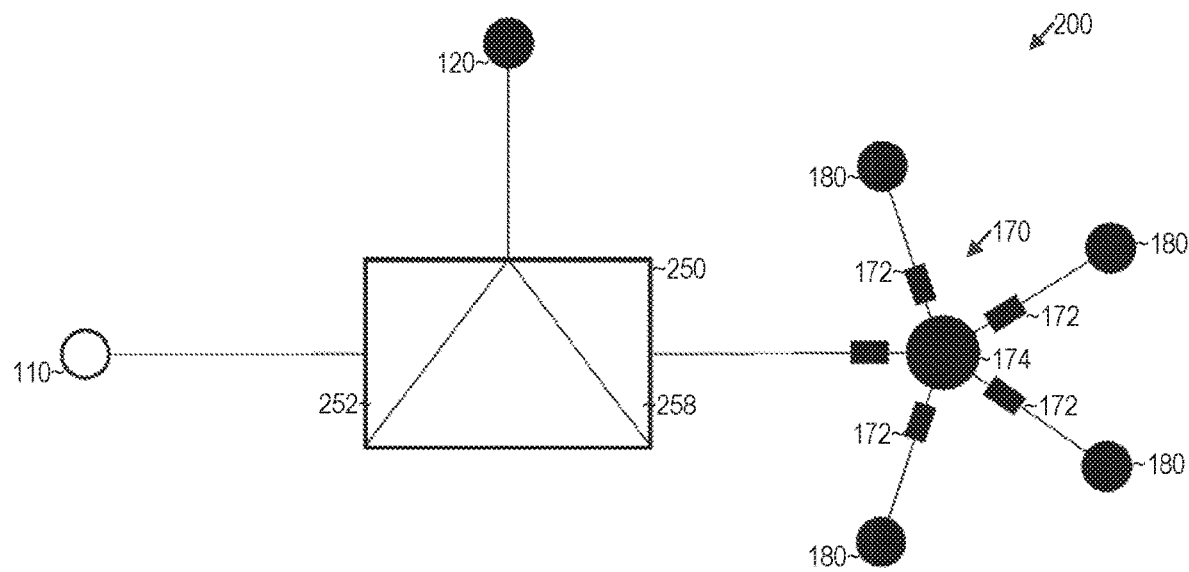
FIG. 2 is a diagram of a prior art gateway splitter that includes a diplex splitter.

It has been common practice, as witnessed by the prior art gateway splitter 200 shown in FIG. 2, to filter the path from the CATV input port 110 to the gateway port 120 with a low-pass filter designed to pass the CATV bandwidth and reject the MoCA bandwidth. This was done by connecting the CATV input port 110 to either the low-pass section 252 of a diplex filter 250 as shown in FIG. 2 or to a discrete low-pass filter to block MoCA signals from returning to the CATV input port 110 from the gateway port 120 or the MoCA ports 180. Since the gateway device communicates with both the CATV network and the MoCA network, the gateway port 120 will pass signals from 5 MHz to 1675 MHz. This means that MoCA frequency band signals originating from the gateway device would communicate with both the CATV network and the MoCA network unless they were blocked from exiting the input port. The choice of a low-pass filter or diplex filter 250 depended upon the bandwidth allocation of the CATV network and was determined by electronic components.

Figure 10:
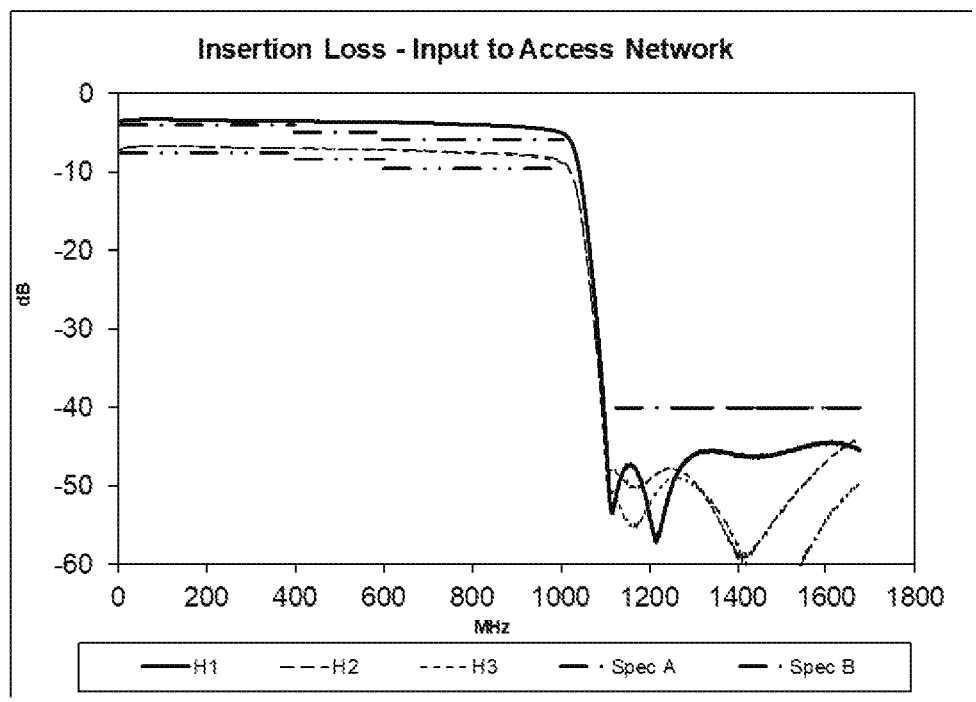
FIG. 10 is a graph of the insertion loss from the CATV input to the gateway ports of a prior art MoCA diplex filter, where the specification indicates the maximum insertion loss allowed below 1002 MHz, and indicates the minimum loss allowed above 1125 MHz.

FIG. 10 is a graph of the insertion loss from the CATV input port 110 to the gateway ports 120 (or "access network" ports) of a prior art MoCA diplex filter (designed for a 1002 MHz CATV system) where the specification indicates the maximum insertion loss allowed below 1002 MHz and the minimum loss allowed above 1125 MHz. Three traces are visible indicating that there are three gateway ports 120 connected to the outputs of an unbalanced 3-way splitter. The sharp cut-off above 1002 MHz, due to the multi-stage low-pass filter section, shows that this product can only be used in a 1 GHz system.

Figure 11:
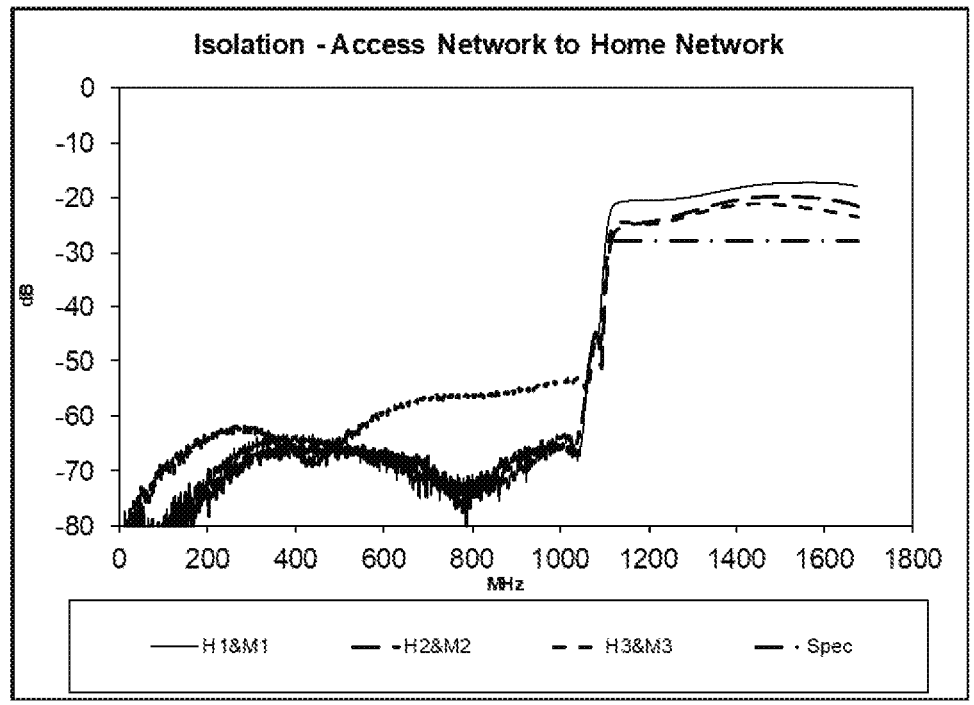
FIG. 11 is a graph of the isolation from the gateway ports to the MoCA ports of a prior art MoCA diplex filter where the specification indicates the maximum loss allowed above 1125 MHz.

FIG. 11 is a graph of the signal loss (isolation) from the gateway ports 120 (or "access network" ports) to the MoCA ports 180 (or "home network" ports) of a prior art MoCA diplex filter where the specification indicates the maximum loss allowed above 1125 MHz. As shown in FIG. 11, the diplex filter with typical multi-stage high-pass filtering has a sharp roll-off as is designed for a tight band split between the CATV and MoCA frequency bands. For example, the DOCSIS 3.1 standard specifies a CATV frequency band of 5-1218 MHz and a MoCA frequency band of 1275-1675 MHz. The guard band between the low-pass section and high-pass section is only 57 MHz wide, with a stop-band attenuation specification of greater than 40 dB. This is an aggressive cross-over requirement that requires careful tuning.

Benefits of the Present Disclosure

Figure 12:
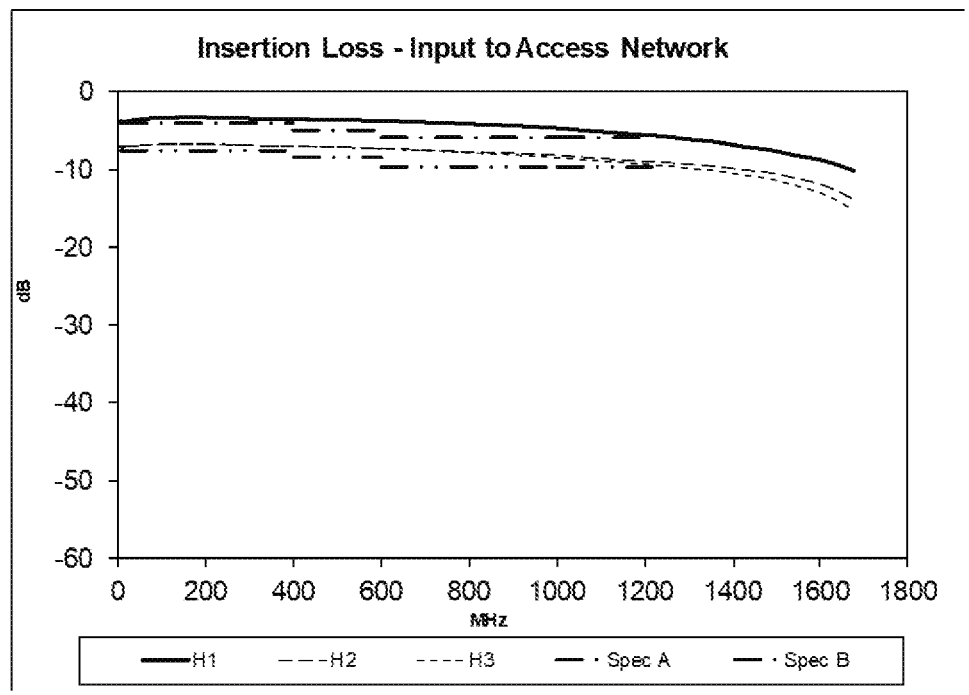
FIG. 12 is a graph of the insertion loss from the CATV input port to the gateway ports of the universal MoCA gateway splitter where the specification indicates the maximum loss allowed below 1218 MHz.

The present disclosure is referred to as a "universal" MoCA gateway splitter because it addresses the frequency inflexibility of the prior art MoCA splitters by removing the low-pass filter following the CATV input port 110. FIG. 12 is a graph of the insertion loss from the CATV input port 110 to the gateway ports 120 (or "access network" ports) of the universal MoCA gateway splitter 900 where the specification indicates the maximum loss allowed below 1218 MHz. As shown in FIG. 12, the universal MoCA gateway splitter 900 is capable of efficiently transmitting the CATV input signal from the CATV input port 110 to the one or more gateway ports 120 regardless of where the upper frequency limit of the CATV frequency band is now or is proscribed to be in the future. In other words, universal MoCA gateway splitter 900 is agnostic to the bandwidth allocations of the CATV system and insertion loss from the CATV input port 110 to the gateway ports 120 is optimized for the most efficient transmission of signals between the CATV network and the gateway devices. Because the design objective of blocking the MoCA frequency band with a low-pass filter has been abandoned, the CATV network bandwidth can grow without equipment obsolescence.

Figure 13:
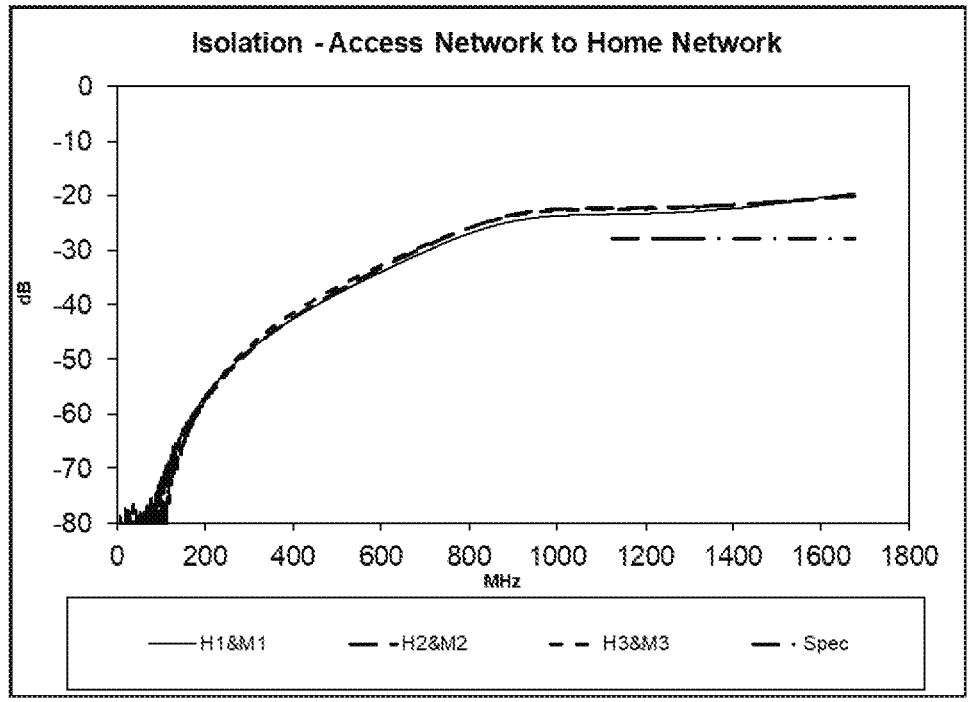
FIG. 13 is a graph showing the isolation loss of a gateway port to a MoCA port of the universal MoCA gateway splitter where the specification indicates the maximum isolation loss allowed above 1125 MHz.

Rather than using low-pass filtering, the universal MoCA gateway splitter 900 addresses access to the lowest edge of the MoCA frequency band (which, for pre-DOCSIS 3.1 devices is 1125 MHz) through the use of a microstrip directional coupler with ¼ wavelength tuning and capacitive coupling. FIG. 13 is a graph showing the isolation loss from a gateway port 120 (or "access network" port) to a MoCA port 180 (or "home network" port) of the universal MoCA gateway splitter 900 where the specification indicates the maximum isolation loss allowed above 1125 MHz. As shown in FIG. 13, the smooth roll-off toward the lower frequencies provided by the universal MoCA gateway splitter 900 provides gentle high-pass coupling with fewer components and less precise tuning. Again, the objective of blocking the CATV frequency band from the MoCA frequency band with a sharp high-pass filter has been abandoned.

MoCA frequency band signals can interfere with the CATV network if they are allowed to enter or exit a network interface device through the CATV input port 110. However, the universal MoCA gateway splitter 900 provides a solution to this problem that is more cost effective to implement than prior art MoCA splitters.

Figure 14:
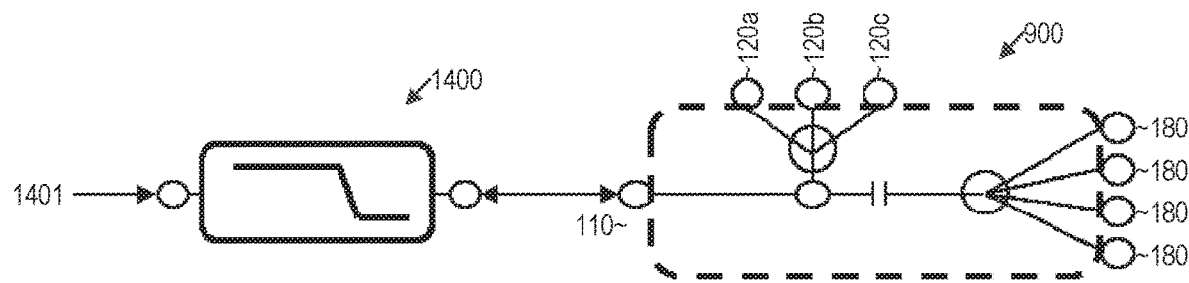
FIG. 14 is a diagram of the universal MoCA gateway splitter with a point-of-entry low-pass filter that may be provided between the input of the universal MoCA gateway splitter and the CATV headend according to an exemplary embodiment.

FIG. 14 is a diagram of the universal MoCA gateway splitter 900 with a point-of-entry low-pass filter 1400 that may be provided between the CATV input port 110 of the universal MoCA gateway splitter 900 and the CATV head-end 1401 according to an exemplary embodiment. A point-of-entry low-pass filter 1400 has a cutoff frequency appropriate to the current CATV frequency band. As the CATV frequency band expands (e.g., to 1.8 GHz and beyond), the universal MoCA gateway splitter 900 will be able to adapt simply by changing the point-of-entry filter 1500 in front of it. A point-of-entry filter 1500 is a two-port device that requires very little effort to change in the field. A gateway splitter, on the other hand, is an eight-to twelve-port device and changing that many coaxial connections is more expensive from an operations and obsolescence point of view.

Figure 15:
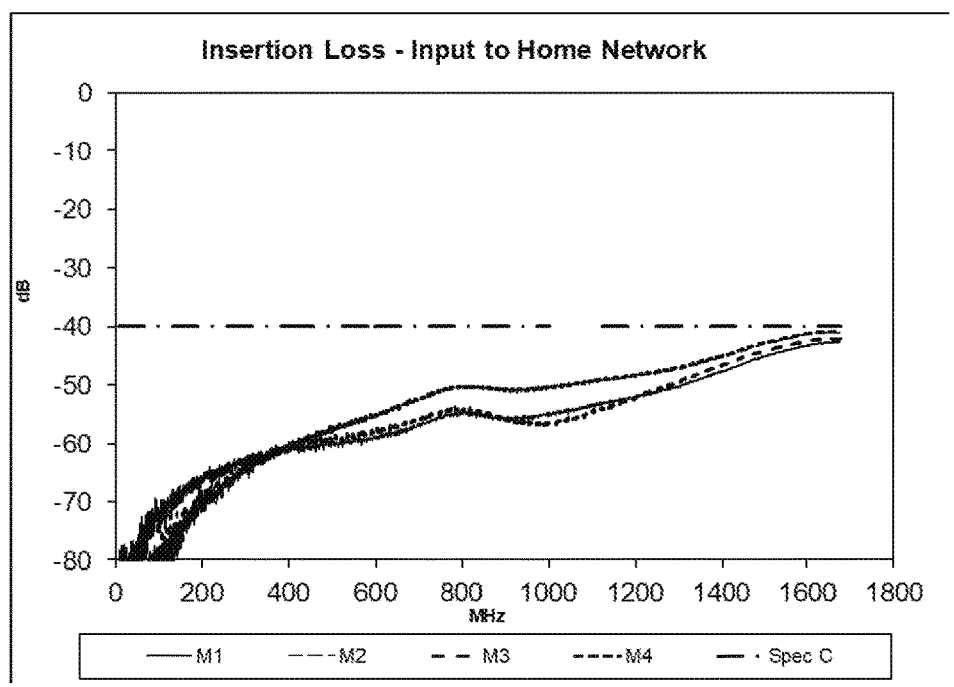
FIG. 15 is a graph showing the insertion loss of the universal MoCA gateway splitter from the CATV input port to the MoCA ports where the specification indicates the minimum loss allowed below 1002 MHz.

FIG. 12 (described above) is a graph showing the insertion loss of the universal MoCA gateway splitter 900 from the CATV input port 110 to the gateway ports 120 ("access network" ports). FIG. 15 is a graph showing the insertion loss of the universal MoCA gateway splitter 900 from the CATV input port 110 to the MoCA ports 180 ("home network" ports) where the specification indicates the minimum loss allowed below 1002 MHz.

Figure 16:
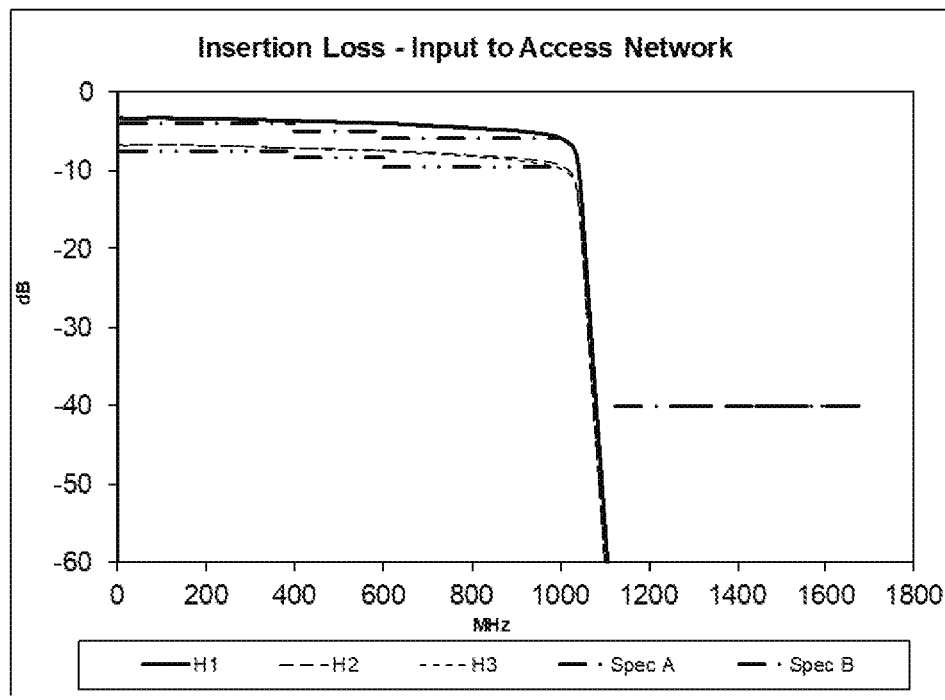
FIG. 16 is a graph showing the insertion loss from the CATV input of the point-of entry filter to the gateway ports of the universal MoCA gateway splitter showing the effect of adding the point of entry filter to the universal gateway splitter loss of FIG. 12.
Figure 17:
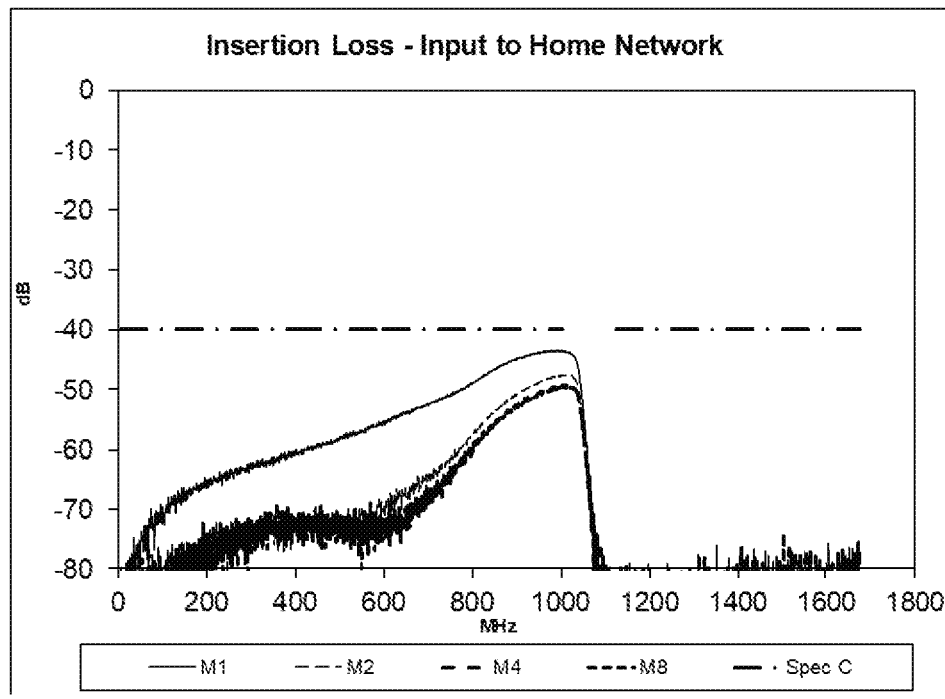
FIG. 17 is a graph showing the insertion loss from the CATV input of the point-of entry filter to the MoCA ports of the universal MoCA gateway splitter showing the effect of adding the point of entry filter to the universal gateway splitter loss of FIG. 15.

FIGS. 16 and 17 are graphs showing the insertion loss of a universal MoCA gateway splitter 900 with a point-of entry filter 1400 (in this example, with a cutoff frequency of 1 GHz) externally connected to the CATV input port 110 as shown in FIG. 14. FIG. 16 is a graph showing the insertion loss from the CATV input of the point-of entry filter 1400 to the gateway ports 120 ("access network" ports) of the universal MoCA gateway splitter 900 showing the effect of adding the point of entry filter to the universal gateway splitter loss of FIG. 12. FIG. 17 is a graph showing the insertion loss from the CATV input of the point-of entry filter 1400 to the MoCA ports 180 ("home network" ports) of the universal MoCA gateway splitter 900 showing the effect of adding the point of entry filter to the universal gateway splitter loss of FIG. 15.

In contrast to the graph shown in FIGS. 12 and 15, FIGS. 16 and 17 show that the universal MoCA gateway splitter 900 with the point-of entry filter 1400 blocks MoCA frequency band signals from the gateway ports 120 and MoCA ports 180 from entering the CATV network via the CATV headend 1401. As the CATV frequency band expands, the 1 GHz point-of entry filter 1400 may be easily replaced with a 1.2 GHz point-of-entry filter 1400, which would extend the roll-off to 1.2 GHz. Accordingly, the universal MoCA gateway splitter 900 is easily adapted to the characteristic bandwidth plan of any CATV system.

As mentioned above, the gateway splitter 300 may include any type of directional coupler, such as a hybrid transformer directional coupler with wires twisted together that form coupled transmission paths. The microstrip directional coupler 500 of FIG. 5 with the coupled microstrip transmission lines 400 of FIG. 4, however, provides specific technical benefits. The microstrip directional coupler 500 of FIG. 5 does not function well in the CATV frequency band, which is beneficial as it provides isolation between the CATV frequency band and the MoCA frequency band. The first transmission line 420 has a wider bandwidth than the coupled second microstrip transmission line 480, allowing signals in the CATV frequency band ($I_{CATV}$) to travel easily on the first transmission line 420 that connects the CATV input port 110 to the gateway port 120. The ¼ wave bandpass coupling of the coupled second microstrip transmission line 480 and the directivity of the signal flow between the gateway port 120 and the MoCA ports 180 enhances isolation between the MoCA ports 180 and the CATV input 110 (as described above with reference to FIGS. 4-5).

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A Multimedia over Coax Alliance (MoCA) gateway splitter that provides functionality for a MoCA device to transmit signals to a gateway device over a MoCA frequency band having a center frequency, the center frequency of the MoCA frequency band having a wavelength, the MoCA gateway splitter comprising:
   a directional coupler comprising a first transmission path and a second transmission path that is coupled to the first transmission path, the first transmission path and the second transmission path both having a length that is one-fourth of the wavelength of the center frequency of the MoCA frequency band;
   a gateway port electrically connected to the first transmission path;
   a cable television (CATV) input port electrically connected to the first transmission path; and
   a MoCA port electrically connected to the second transmission path such that the MoCA port is isolated from the CATV input port and coupled to the gateway port.

2. The MoCA gateway splitter of claim 1, wherein the MoCA port is electrically connected to the second transmission path via a resistive splitter.

3. The MoCA gateway splitter of claim 2, wherein the resistive splitter is electrically connected to one or more additional MoCA ports.

4. The MoCA gateway splitter of claim 1, wherein the second transmission path is electrically connected to ground.

5. The MoCA gateway splitter of claim 1, wherein the CATV input port is electrically connected to the first transmission path via a hybrid splitter.

6. The MoCA gateway splitter of claim 5, wherein the hybrid splitter is electrically connected to a third transmission path of a second directional coupler, the second directional coupler including a fourth transmission path that is coupled to the third transmission path.

7. The MoCA gateway splitter of claim 6, wherein the third transmission path of the second directional coupler is electrically connected to a second gateway port.

8. The MoCA gateway splitter of claim 7, wherein the fourth transmission path of the second directional coupler is electrically connected to the MoCA port.

9. The MoCA gateway splitter of claim 8, wherein the fourth transmission path of the second directional coupler is electrically connected to the MoCA port via a common microstrip node.

10. The MoCA gateway splitter of claim 9, wherein the CATV input is electrically connected to a fifth transmission path of a third directional coupler, the third directional coupler including a sixth transmission path that is coupled to the fifth transmission path, the fifth transmission path of the third directional coupler being electrically connected to a third gateway port, the sixth transmission path of the third directional coupler being electrically connected to the MoCA port via the common microstrip node.

11. A method of making a Multimedia over Coax Alliance (MoCA) gateway splitter that provides functionality for a MoCA device to transmit signals to a gateway device over a MoCA frequency band, the MoCA frequency band having a center frequency, the center frequency having a wavelength, the method comprising:
   electrically connecting a gateway port to a first transmission path of a directional coupler having a second transmission path that is coupled to the first transmission path, the first transmission path and the second transmission path both having a length that is one-fourth of the wavelength of the center frequency of the MoCA frequency band;
electrically connecting a cable television (CATV) input port to the first transmission path; and
electrically connecting a MoCA port to the second transmission path such that the MoCA port is isolated from the CATV input port and coupled to the gateway port.

12. The method of claim 11, wherein the CATV input port is electrically connected to the first transmission path via a hybrid splitter.

13. The method of claim 12, the method further comprising:
electrically connecting the hybrid splitter to a third transmission path of a second directional coupler having a fourth transmission path that is coupled to the third transmission path.

14. The method of claim 13, the method further comprising:
electrically connecting the third transmission path of the second directional coupler to a second gateway port.

15. The method of claim 14, the method further comprising:
electrically connecting the fourth transmission path of the second directional coupler to the MoCA port.

16. The method of claim 15, wherein the fourth transmission path of the second directional coupler is electrically connected to the MoCA port via a common microstrip node.

17. The method of claim 16, the method further comprising:
electrically connecting the CATV input to a fifth transmission path of a third directional coupler, the third directional coupler including a sixth transmission path that is coupled to the fifth transmission path;
electrically connecting the fifth transmission path of the third directional coupler to a third gateway port;
electrically connecting the sixth transmission path of the third directional coupler to the MoCA port via the common microstrip node.

18. A Multimedia over Coax Alliance (MoCA) gateway splitter, comprising:
a plurality of directional couplers, each of the directional couplers comprising:
a first transmission path that includes an input port and an output port; and
a second transmission path, coupled to the first transmission path, that includes tap port and a grounded isolated port, wherein the tap port of the second transmission path is proximate the input port of the first transmission path and the isolated port of the second transmission path is proximate the output port of the first transmission path;
a plurality of gateway ports each electrically connected to the input port of one of the plurality of directional couplers;
a cable television (CATV) input port electrically connected to the output port of each of the directional couplers via one or more splitters; and
a plurality of MoCA ports each electrically connected to the tap ports of each of the plurality of directional couplers via a common node such that the plurality of MoCA ports are coupled to the plurality of gateway ports and are isolated from the CATV input port.

19. The MoCA gateway splitter of claim 18, wherein plurality of MoCA ports are electrically connected to the common node via a resistive splitter.

20. The MoCA gateway splitter of claim 18, wherein the or more splitters are hybrid splitters.

21. The MoCA gateway splitter of claim 18, wherein the plurality of directional couplers comprise three directional couplers.

22. The MoCA gateway splitter of claim 18, wherein:
the plurality of a directional couplers provide functionality for a MoCA device to transmit signals to a plurality of gateway devices over a MoCA frequency band having a center frequency, the center frequency of the MoCA frequency band having a wavelength; and
the first transmission path and the second transmission path of each directional coupler both have a length that is one-fourth of the wavelength of the center frequency of the MoCA frequency band.

23. A method of making a Multimedia over Coax Alliance (MoCA) gateway splitter, the method comprising:
providing a plurality of directional couplers, each of the directional couplers comprising:
a first transmission path that includes an input port and an output port; and
a second transmission path, coupled to the first transmission path, that includes tap port and a grounded isolated port, wherein the tap port of the second transmission path is proximate the input port of the first transmission path and the isolated port of the second transmission path is proximate the output port of the first transmission path;
electrically connecting each of a plurality of gateway ports to the input port of one of the plurality of directional couplers;
electrically connecting a cable television (CATV) input port to the output port of each of the directional couplers via one or more splitters; and
electrically connecting a plurality of MoCA ports to the tap ports of each of the plurality of directional couplers via a common node such that the plurality of MoCA ports are coupled to the plurality of gateway ports and are isolated from the CATV input port.

24. The method of claim 23, wherein plurality of MoCA ports are electrically connected to the common node via a resistive splitter.

25. The method of claim 23, wherein the or more splitters are hybrid splitters.

26. The method of claim 23, wherein the plurality of directional couplers comprise three directional couplers.

27. The method of claim 23, wherein:
the plurality of directional couplers provide functionality for a MoCA device to transmit signals to a plurality of gateway devices over a MoCA frequency band having a center frequency, the center frequency of the MoCA frequency band having a wavelength; and
the first transmission path and the second transmission path of each directional coupler both have a length that is one-fourth of the wavelength of the center frequency of the MoCA frequency band.

28. A Multimedia over Coax Alliance (MoCA) gateway splitter, comprising:
a first directional coupler comprising a first transmission path and a second transmission path that is coupled to the first transmission path;
a first gateway port electrically connected to the first transmission path;
a second directional coupler comprising a third transmission path and a fourth transmission path that is coupled to the third transmission path;

a second gateway port electrically connected to the third transmission path;

a third directional coupler comprising a fifth transmission path and a sixth transmission path that is coupled to the fifth transmission path;

a third gateway port electrically connected to the third transmission path;

a cable television (CATV) input port electrically connected to the first transmission path, the third transmission path, and the fifth transmission path; and a MoCA port electrically connected to the second transmission path, the fourth transmission path, and the sixth transmission path such that the MoCA port is isolated from the CATV input port and coupled to the first gateway port, the second gateway port, and the third gateway port.

29. The MoCA gateway splitter of claim 28, wherein the MoCA port is electrically connected to the second transmission path, the fourth transmission path, and the sixth transmission port via a resistive splitter.

30. The MoCA gateway splitter of claim 29, wherein the resistive splitter is electrically connected to one or more additional MoCA ports.

31. The MoCA gateway splitter of claim 28, wherein the second transmission path, the fourth transmission path, and the sixth transmission path are each electrically connected to ground.

32. The MoCA gateway splitter of claim 28, wherein the CATV input port is electrically connected to the first transmission path, the third transmission path, and the fifth transmission path via one or more hybrid splitters.

33. The MoCA gateway splitter of claim 28, wherein the second transmission path, the fourth transmission path, and the sixth transmission path are each electrically connected to the MoCA port via a common microstrip node.

34. The MoCA gateway splitter of claim 28, wherein:
the directional coupler provides functionality for a MoCA device to transmit signals to the gateway port over a MoCA frequency band, the MoCA frequency band having a center frequency, the center frequency having a wavelength; and
the first transmission path and the second transmission path both have a length that is one-fourth of the wavelength of the center frequency of the MoCA frequency band.

35. A method of making a Multimedia over Coax Alliance (MoCA) gateway splitter, the method comprising:
electrically connecting a first gateway port to a first transmission path of a first directional coupler having a second transmission path that is coupled to the first transmission path;
electrically connecting a second gateway port to a third transmission path of a second directional coupler having a fourth transmission path that is coupled to the third transmission path;
electrically connecting a third gateway port to a fifth transmission path of a third directional coupler having a sixth transmission path that is coupled to the fifth transmission path;
electrically connecting a cable television (CATV) input port to the first transmission path, the third transmission path, and the fifth transmission path; and
electrically connecting a MoCA port to the second transmission path, the fourth transmission path, and the sixth transmission path such that the MoCA port is isolated from the CATV input port and coupled to the first gateway port, the second gateway port, and the third gateway port.

36. The method of claim 35, wherein the CATV input port is electrically connected to the first transmission path, the third transmission path, and the fifth transmission path via one or more hybrid splitters.

37. The method of claim 35, wherein the second transmission path, the fourth transmission path, and the sixth transmission path are each electrically connected to the MoCA port via a common microstrip node.

38. The method of claim 35, wherein:
the directional coupler provides functionality for a MoCA device to transmit signals to the gateway port over a MoCA frequency band, the MoCA frequency band having a center frequency, the center frequency having a wavelength; and
the first transmission path and the second transmission path both have a length that is one-fourth of the wavelength of the center frequency of the MoCA frequency band.

* * * * *